US012751434B2

(12) United States Patent
Rosher et al.

(10) Patent No.: US 12,751,434 B2
(45) Date of Patent: Oct. 6, 2026

(54) SLIDE BAIT FISHING LURE

(71) Applicants: Ray Rosher, Terrace, FL (US); Idalberto Delgado, Cutler Bay, FL (US)

(72) Inventors: Ray Rosher, Terrace, FL (US); Idalberto Delgado, Cutler Bay, FL (US)

( * ) Notice: Subject to any disclaimer, the term of this patent is extended or adjusted under 35 U.S.C. 154(b) by 0 days.

(21) Appl. No.: 18/765,152

(22) Filed: Jul. 5, 2024

(65) Prior Publication Data

US 2025/0017185 A1 Jan. 16, 2025

Related U.S. Application Data

(60) Provisional application No. 63/526,180, filed on Jul. 11, 2023.

(51) Int. Cl.
*A01K 85/18* (2006.01)
*A01K 85/00* (2006.01)

(52) U.S. Cl.
CPC .......... *A01K 85/18* (2013.01); *A01K 85/1833* (2022.02)

(58) Field of Classification Search
CPC ...... A01K 85/024; A01K 85/18; A01K 85/00; A01K 85/1811; A01K 85/1821; A01K 85/1823; A01K 85/1833; A01K 85/1851
USPC .... 43/42, 42.09, 42.24, 42.28, 42.29, 42.37, 43/42.38, 44.81, 44.9
See application file for complete search history.

(56) References Cited

U.S. PATENT DOCUMENTS

| | | | | | | |
|---|---|---|---|---|---|---|
| 2,518,593 | A | * | 8/1950 | Bell | A01K 83/06 | 43/44.2 |
| 2,556,702 | A | * | 6/1951 | Nielsen | A01K 85/16 | 43/42.1 |
| 3,172,227 | A | * | 3/1965 | Mackey | A01K 85/18 | 43/42.31 |
| 3,645,031 | A | * | 2/1972 | Egles | A01K 83/06 | 43/44.2 |
| 4,163,337 | A | * | 8/1979 | Kress | A01K 85/00 | 43/42.36 |
| 4,841,665 | A | * | 6/1989 | McGahee | A01K 85/00 | 43/42.24 |
| 4,918,854 | A | * | 4/1990 | Webre, Jr. | A01K 85/01 | 43/42.22 |
| 5,175,955 | A | * | 1/1993 | Wilson | A01K 85/00 | 43/42.39 |
| 5,207,016 | A | * | 5/1993 | Pate | A01K 85/00 | 43/42.35 |
| 5,220,743 | A | * | 6/1993 | McClellan | A01K 85/00 | 43/42.38 |
| 5,335,441 | A | * | 8/1994 | Blackwell | A01K 85/00 | 43/42.39 |
| 5,564,220 | A | * | 10/1996 | Blicha | A01K 85/00 | 43/42.32 |
| 5,628,139 | A | * | 5/1997 | Rhoten | A01K 85/12 | 43/42.38 |
| 5,649,384 | A | * | 7/1997 | Manning | A01K 85/00 | 43/42.39 |

(Continued)

*Primary Examiner* — Maria E Graber
(74) *Attorney, Agent, or Firm* — Andrew Morabito

(57) ABSTRACT

The present invention is a slide bait comprising a head portion having a slot which passes from a first side to a second side and an attachment member secured to the second side of the head portion; and a bait body securing to the head portion via the attachment member.

17 Claims, 5 Drawing Sheets

(56) References Cited

U.S. PATENT DOCUMENTS

| | | | | | |
|---|---|---|---|---|---|
| 5,784,827 | A * | 7/1998 | Jimenez, Jr. | A01K 85/00 | 43/44.8 |
| 6,061,948 | A * | 5/2000 | Boucek | A01K 85/00 | 43/42.39 |
| 6,094,853 | A * | 8/2000 | Lim | A01K 85/02 | 43/43.11 |
| 6,182,391 | B1 * | 2/2001 | Hubbard | A01K 85/00 | 43/42.34 |
| 6,675,526 | B1 * | 1/2004 | Baron | A01K 85/16 | 43/42.36 |
| 6,708,442 | B2 * | 3/2004 | Kress | A01K 83/06 | 43/44.4 |
| 6,718,683 | B2 * | 4/2004 | Hawkins | A01K 85/00 | 43/42.38 |
| 7,234,267 | B1 * | 6/2007 | Konstant | A01K 85/02 | 43/42.24 |
| 7,415,793 | B1 * | 8/2008 | Borchardt | A01K 91/065 | 43/42.24 |
| 7,497,046 | B1 * | 3/2009 | Jefferson | A01K 85/00 | 43/44.4 |
| 7,735,257 | B1 * | 6/2010 | Firmin | A01K 85/00 | 43/44.8 |
| 7,841,127 | B1 * | 11/2010 | Nakamichi | A01K 83/06 | 43/44.8 |
| 8,079,173 | B2 * | 12/2011 | Corbitt, III | A01K 85/00 | 43/42.31 |
| 9,504,237 | B2 * | 11/2016 | Culver | A01K 85/00 | |
| 10,021,862 | B2 * | 7/2018 | Guennal | A01K 85/00 | |
| 10,206,381 | B2 * | 2/2019 | Rice | A01K 85/00 | |
| 10,492,478 | B1 * | 12/2019 | Parks | A01K 85/00 | |
| 11,330,807 | B2 * | 5/2022 | Johnson | A01K 85/00 | |
| 11,412,722 | B1 * | 8/2022 | Standke | A01K 83/06 | |
| 11,672,240 | B2 * | 6/2023 | Reed | A01K 85/029 | 43/42.19 |
| 11,856,919 | B2 * | 1/2024 | Malooley | A01K 83/06 | |
| 2003/0136045 | A1 * | 7/2003 | Yamamoto | A01K 85/16 | 43/42.09 |
| 2003/0159328 | A1 * | 8/2003 | Acker | A01K 85/00 | 43/42.37 |
| 2003/0159331 | A1 * | 8/2003 | Pasley | A01K 85/00 | 43/42.15 |
| 2005/0120613 | A1 * | 6/2005 | Pack | A01K 85/00 | 43/44.9 |
| 2007/0193106 | A1 * | 8/2007 | Gregory | A01K 85/00 | 43/42.39 |
| 2008/0168700 | A1 * | 7/2008 | Kim | A01K 85/00 | 43/42.24 |
| 2009/0255169 | A1 * | 10/2009 | Lowitzki | A01K 85/00 | 43/42.37 |
| 2012/0005946 | A1 * | 1/2012 | Bennis | A01K 85/00 | 43/44.87 |
| 2012/0023804 | A1 * | 2/2012 | Hogan | A01K 85/00 | 43/44.2 |
| 2014/0059916 | A1 * | 3/2014 | Culver | A01K 85/02 | 43/42.1 |
| 2015/0089858 | A1 * | 4/2015 | Burdick | A01K 85/16 | 43/42.09 |
| 2022/0240492 | A1 * | 8/2022 | Boldt | A01K 85/1833 | |
| 2022/0264856 | A1 * | 8/2022 | Malooley | A01K 83/06 | |
| 2023/0301285 | A1 * | 9/2023 | Åström | A01K 85/00 | |
| 2024/0341292 | A1 * | 10/2024 | Rovetto | A01K 83/064 | |

* cited by examiner

SLIDE BAIT FISHING LURE

CROSS-REFERENCE TO RELATED APPLICATIONS

This application claims the benefit of priority under 35 USC 120 of U.S. application No. 63/526,180 filed Jul. 11, 2023. The disclosure of the prior applications is considered part of (and is incorporated by reference in) the disclosure of this application.

BACKGROUND OF THE INVENTION

The present invention relates to a lure, and more particularly to a lure with a slide bait design.

In America, fishing has grown beyond that of a hobby or leisure activity and has become a competitive professional sport. As a result, the technology used by anglers to catch fish has become increasingly complex in nature. Fishermen no longer rely on the traditional hook and worm approach to attract their targets. Instead, a broad range of products have hit the market, designed to aid the fisherman to catch more fish. One of the most common and popular fishing accessories is the fishing lure, as evidenced by the multitude of different types and styles available on the market.

While there is an abundance of artificial fishing lures available to the general public, most of these lures once bitten by the fish provide a disadvantage of having a high amount of pressure on the hook that can cause large openings to form in the fishes mouth and can cause the hook to become lost and the hook falling out of the fishes mouth.

It is desired for a lure that once bitten relieves pressure from the hook so that the chance of the hook falling out of the fish's mouth are decreased.

SUMMARY

In a first embodiment the present invention is a slide bait comprising: a head portion having a slot which passes from a first side to a second side and an attachment member secured to the second side of the head portion; and a bait body securing to the head portion via the attachment member.

In a second embodiment the present invention is a slide bait lure comprising: a head portion having a slot which passes from a first side to a second side and an attachment member secured to the second side of the head portion, wherein the attachment member comprises a corkscrew rod and a straight rod; a bait body securing to the head portion via the attachment member; and a hook inserted into the slot and passing through a portion of the bait body.

In a third embodiment the present invention is a slide bait lure comprising: head portion having a slot passing through the head portion; and a bait body securing to the head portion; wherein the slot is sized to receive a hook, and the hook extending through the bait body.

DETAILED DESCRIPTION OF THE INVENTION

Figure 1:
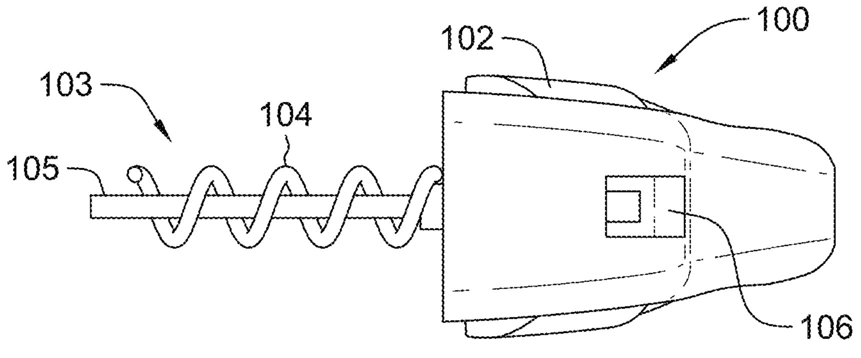
FIG. 1 depicts a top view of a slide bait head, in accordance with one embodiment of the present invention.
Figure 2:
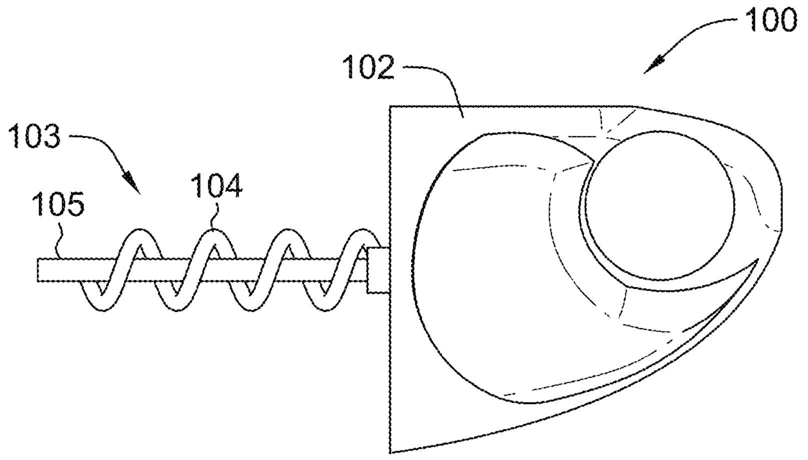
FIG. 2 depicts a side view of the slide bait head, in accordance with one embodiment of the present invention.
Figure 3:
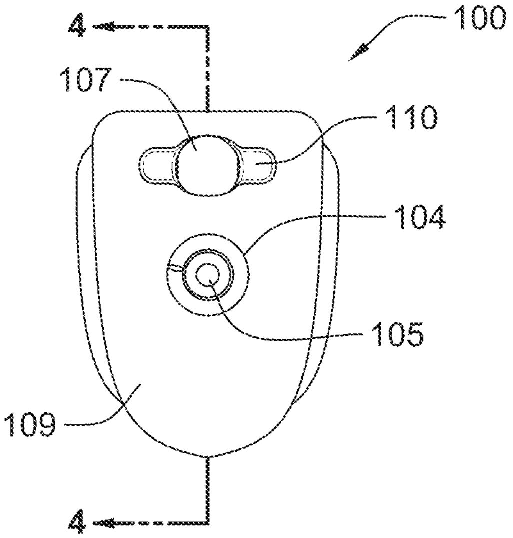
FIG. 3 depicts a rear view of the slide bait head, in accordance with one embodiment of the present invention.
Figure 4:
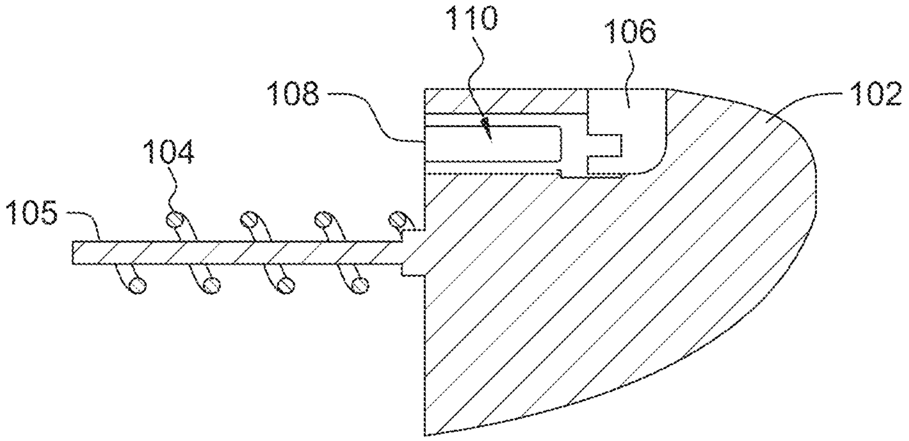
FIG. 4 depicts a section view of the slide bait head, in accordance with one embodiment of the present invention.

The present invention provides lure with a two-piece design, and wherein the hook is releasable from a head portion of the lure. This design is advantageous and unique in that it has a hook pocket that secures the hook in a proper position yet allows the hook and leader to slide through the bait after a fish is hooked. It also utilizes an attachment for a secure connection to a body/tail. This is advantageous because it allows the bait to slide up the leader, thus relieving pressure from the hook and preventing the hook from creating a larger hole in the fish's mouth and possibly falling out of the fish's mouth.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements or use of a “negative” limitation.

FIGS. 1-4 depict various views of a slide bait 100, in accordance with one embodiment of the present invention. The slide bait 100 is comprised of a head portion 102 and an attachment member 103. The head portion 102 overall design is to resemble that shape and look of a feeder fish or a bait fish that the fish which the fisherman desires to catch would eat. The shape, coloring, and overall look may have various forms and looks, and the depicted embodiment is simply just one design that can be used. In the depicted embodiments, along an upper surface of the head portion 102 has a channel 107 that extends from an entrance 106 on the upper surface of the head portion 102 to an exit 108 along a back surface 109 of the head portion 102. A slot 110 distal to the exit 108 is sized to fit a hook 300 (shown in following illustrations). The slot 110 is positioned horizontal to receive the eyelet 301 of a hook 300 The slot 110 is designed to receive a variety of hooks 300 and provide adequate pressure to keep the hook 300 within the slot 110 during casting and reeling. The shape of the slot 110 is based on the hook 300 design. The slot 110 is designed for an eyelet 301 of a hook 300 to remain secured in the slot 110 until a strike occurs (by the fish or animal) and then the slide bait 100 lure can detach from the hook 300 which reduces the chances that a fish breaks loss from the hook 300 because the slide bait 100 is no longer working against the hook 300 in the fish’s mouth. Current lures remain in the fish’s mouth and can create additional resistance which may enlarge the hole created by the hook 300, and increase the chances the fish breaks free of the hook 300.

The attachment member 103 of the head portion 102 is designed to secure a bait body 200 (shown in following illustrations). Attached to the head portion 102 along the back surface 109 is the attachment member 103. The attached member 103 is connected to the head portion 102 substantially at the center of the back surface 109, so that when the bait body 200 is attached to the head portion 102, the edges of the back surface 109 and the bait body 200 substantially align. In the depicted embodiment, the attachment member 103 is comprised of a straight rod 105 and a corkscrew rod 104 wrapped around the straight rod 105. In additional embodiment the attachment member 103 may have different designs such as, but not limited to, only the straight rod 105, the corkscrew rod 104, or various rods of different shapes which will provide adequate securement means for the bait body 200 to stay attached to the head portion 100 during casting and reeling. The attachment member 103 is adjustable based on the material or design of the bait body 200. In other embodiments, fasteners, magnets, or other securing means can be used to attached the bait body 200 to the head portion 100. The attachment member 103 can be made from a variety of metals or plastics. The head portion 100 may be made from a variety of metals (e.g. lead) or plastic materials.

Figure 6:
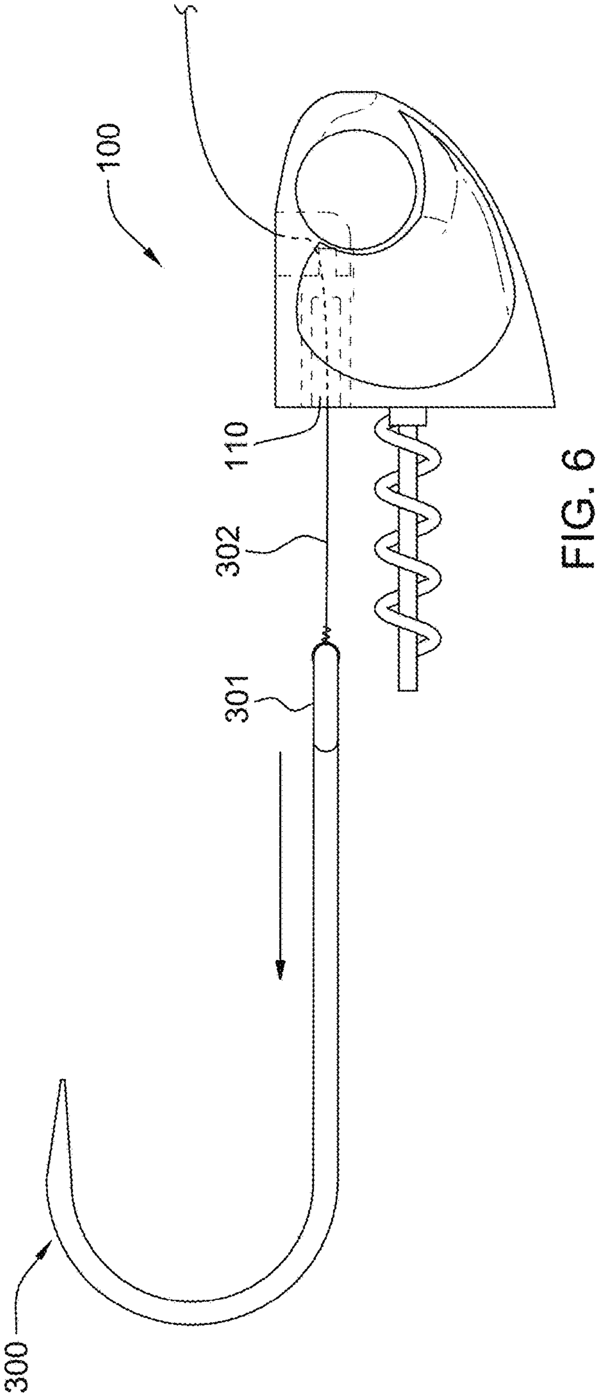
FIG. 6 depicts a view of the slide bait head with the hook removed, in accordance with one embodiment of the present invention.
Figure 7:
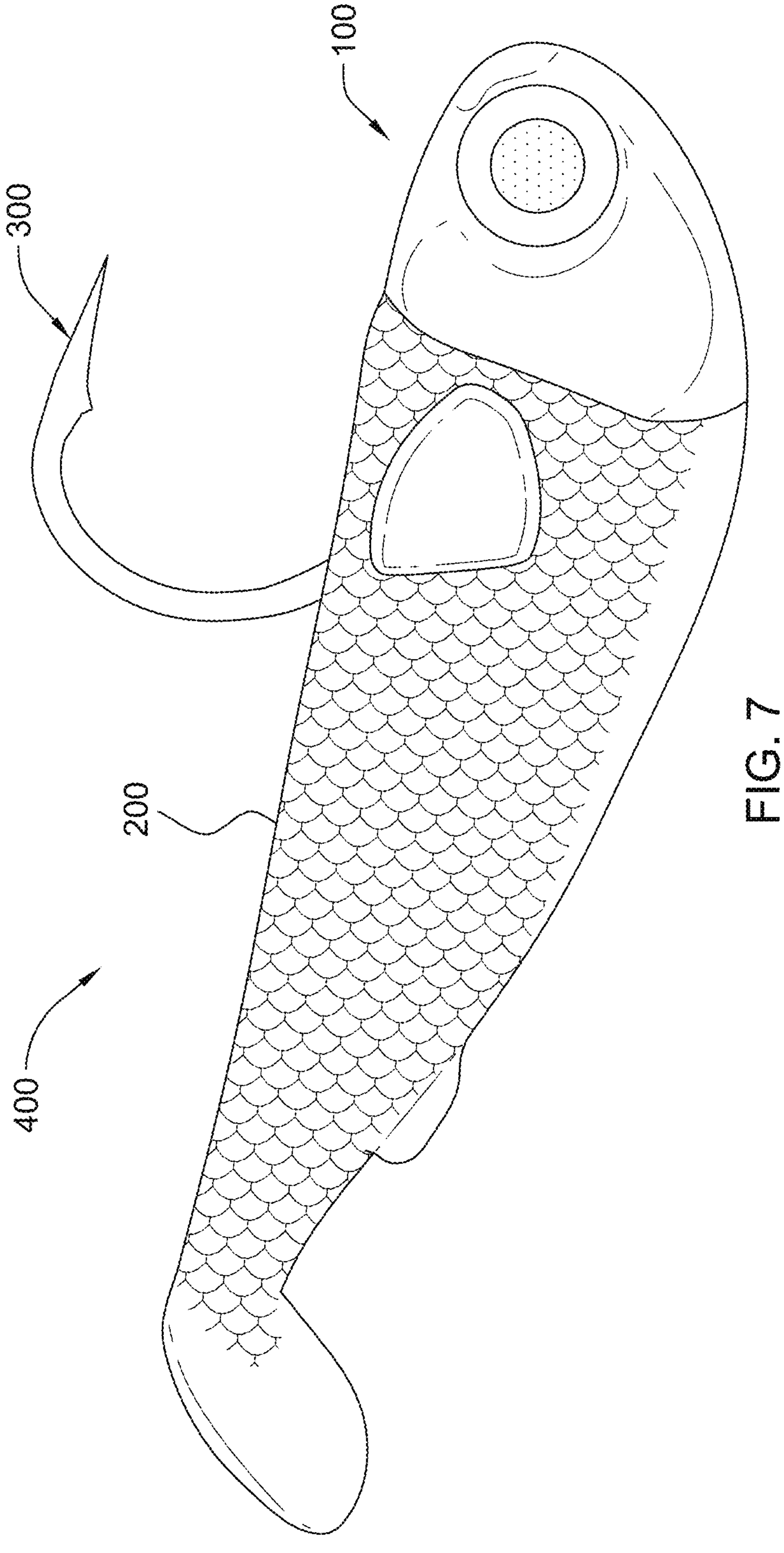
FIG. 7 depicts an isometric view of the slide bait head and body assembly with a hook, in accordance with one embodiment of the present invention.
Figure 8:
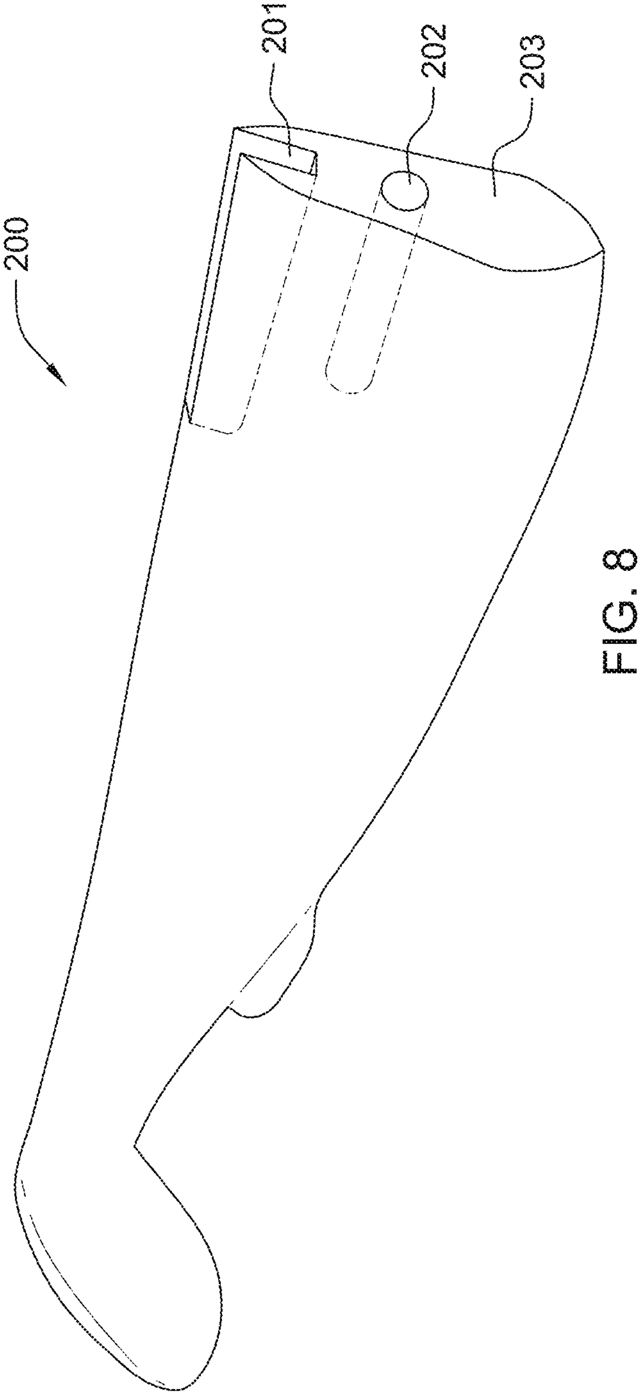
FIG. 8 depicts an isometric view of the body assembly, in accordance with one embodiment of the present invention.

As shown in FIGS. 6-7, slide bait lure assembly 400 is shown, in accordance with one embodiment of the present invention. The bait body 200 is shown secured to the head portion 100 with hook 300 inserted into the slot 110 of the head portion 100. The bait body 200 is screwed onto the head portion 100 via the attachment member 103. In some embodiments, the bait body 200 has an internal opening for the attachment member 103 to fit into. In other embodiments, the attachment member 103 has sharpened ends which enter into the bait body 200 and form the opening. The bait body 200 can be made from a variety of materials both rigid and flexible and is designed to look like the body of a bait fish and is sized to substantially align with the back surface 109 of the head portion 100. In additional embodiments, the body portion made be made from a rigid material based on the desired use of the slide bait lure 400. As shown in the figures this provides for a fish-like design of the slide bait lure 400 to attract the attention of the fish. In the depicted embodiment, the hook 300 extends out of the bait body 200. The bait body 200 has a channel or slot along an upper surface to allow the hook 300 to pass through the bait body 200. In other embodiments, the hook 300 is fed through the bait body 200 and forms the channel. A large portion of the hook 300 is recessed within the bait body 200. The hook 300 is recessed a predetermined distance from the slide bait body based on the size of the bait body 200 and the positioning of the slot 110.

Figure 5:
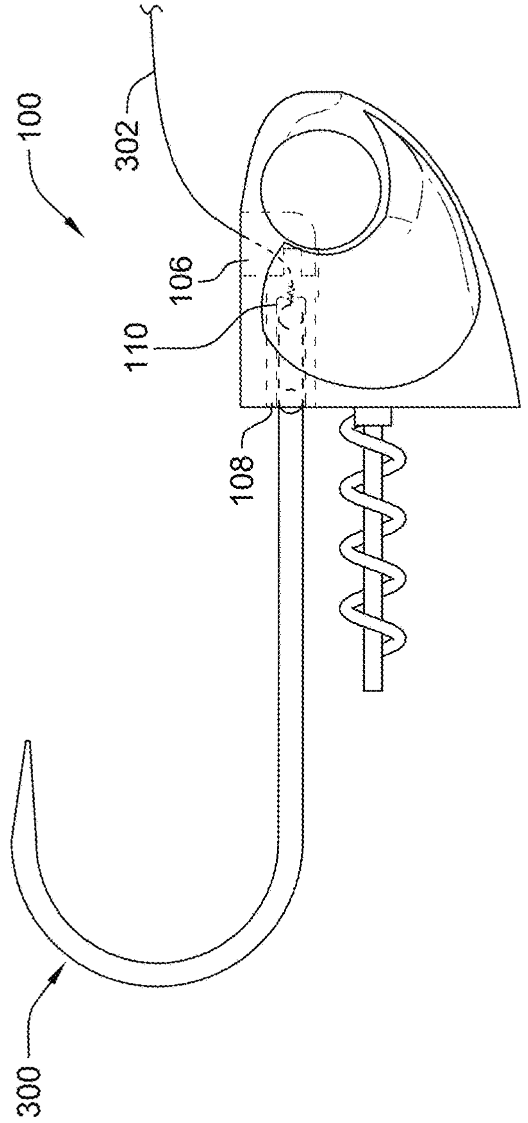
FIG. 5 depicts a view of the slide bait head with a hook, in accordance with one embodiment of the present invention.

As shown FIGS. 5 and 6, in accordance with one embodiment of the present invention, the line 302 is tied to the eyelet 301 of the hook 300 and extends out through the entrance 106. When the hook 300 is inserted into the slot 110, the curved end of the hook extends outward from the body and the eyelet 301 of the hook 300 remains secured to the head portion 100 until it is bitten by a fish, at which time the hook becomes dislodged from the head portion 100. and the hook 300 will become disengaged from the socket when ample resistance (e.g., bitten by a fish and pulled) is applied to the hook 300.

Once a fish engages with the hook 300, the hook 300 becomes disengaged from the slot 110 and the slide bait lure 400 slides down the line 302 so only the hook 300 remains in the fish’s mouth. The channel 107 allows the line 302 which is secured to the hook 300 to pass through the head portion 100. The overall design of the slide bait lure 400 is that the bait body 200 and the head portion 100 provide a seamless integration so that the lure experiences as little resistance in the water when moving to imitate the actions of a real bait fish. This is done by the surface 109 of the head portion 100 is substantially similar to surface 203 of the bait body 200. The maid body 200 has a channel 201 which extended through a portion of the bait body 200 and aligns with the slot 100 and the exit 108 of the head portion 100 so that the hook 300 can sit within the channel 201. The bait body 200 also has a slot 202 which is sized and positioned to receive rod 105. This assists in aligning the bait body 200 with the head portion 100 so that body parts substantially align. The channel 201 width and length may be adjusted based on the size of the lure, the size of the hook, or the like. The slot 202 is of a predetermined diameter and length based on the rod 105. In additional embodiments, the main body 200 has a slot to receive the corkscrew rod 104 as well.

In additional embodiments the channel 107 may be located in other portions of the head portion 102 such as the bottom or the sides. In additional embodiments, more than one channel 107 is integrated into the head portion 100 so that multiple hooks 300 can be used. The bait body 200 has equal number of channels in the appropriate locations to allow for the hook(s) 300.

The shape, size, color, and texture of the head portion 100 and the bait body 200 are adjustable. In the depicted embodiment, the head portion 100 is a made from lead, whereas the bait body 200 is made from a flexible polymer material.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

It will be further understood that various changes in the details, materials, and arrangements of the parts which have been described and illustrated in order to explain the nature of this invention may be made by those skilled in the art without departing from the scope of the invention as expressed in the following claims.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A slide bait comprising:

a head portion having a channel with a single bend which passes from a first side to a second side and a first portion of the channel sized to receive an eye of a J-hook fishing hook and a second part of the channel sized to receive a fishing line and expose the eye of the J-hook fishing hook, and an attachment member secured to the second side of the head portion, wherein the second side has a predetermined profile and a channel entrance is positioned distal to the attachment member; and a bait body securing to the head portion via the attachment member, wherein the J-hook fishing hook extends through the bait body and a barb of the J-hook fishing hook extends out of a top surface of the bait body;

wherein the eye of the J-hook fishing hook is below a surface the head portion and accessible through the first portion of the channel.

2. The slide bait of claim 1, wherein the channel is sized to receive a hook.

3. The slide bait of claim 1, wherein the channel is sized to pressure fit a hook in place.

4. The slide bait of claim 1, wherein the head portion and the bait body substantially align and the slide bait mimic a fish body.

5. The slide bait of claim 1, wherein the attachment member comprises a corkscrew rod.

6. The slide bait of claim 1, wherein the attachment member comprises a straight rod.

7. The slide bait of claim 1, wherein the bait body has a channel sized to fit a hook.

8. The slide bait of claim 1, wherein the channel of the head portion and the attachment member of the head portion are positioned relative to one another.

9. A slide bait lure comprising:

a head portion having a slot which passes from a first side to a second side, and wherein the slot has a first opening sized to receive an eye of a fish hook and a second opening where the eye of the fish hook is accessible below a surface of the head portion to receive a fishing line and an attachment member secured to the second side of the head portion, wherein the attachment member comprises a corkscrew rod and a straight rod, and wherein the slot is positioned distal to a top edge of the head portion and the attachment member is positioned distal to a bottom edge of the head portion;

a bait body secured to the head portion via the attachment member; and a hook inserted into the slot and passing through a portion of the bait body.

10. The slide bait of claim 9, wherein the slot is sized to securely fit the hook within the slot.

11. The slide bait of claim 9, wherein the bait body has a channel sized to receive the hook.

12. A slide bait lure comprising:

a head portion having a slot connected to a channel extending through the head portion, and wherein the slot is sized to fit an eye of a fish hook and the channel provides access to the eye of the fish hook below a surface of the head portion to fit a fishing line through the eye of the fish hook, and a rod extending from the head portion and wherein the slot and the rod are positioned a predetermined distance apart; and a bait body secured to the head portion;

wherein the slot is sized to receive a hook eye, and a hook bend extends through an upper portion of the bait body and a barb is exposed above the bait body.

13. The slide bait of claim 12, wherein the bait body has a channel extended through a portion of an upper end.

14. The slide bait of claim 12, wherein the bait body has a slot through a portion of the bait body.

15. The slide bait of claim 14, wherein the slot of the bait body aligns with the rod of the head portion.

16. The slide bait of claim 12, wherein the slot is sized so that the hook is pressure fit within the slot.

17. The slide bait of claim 12, wherein the head portion has a first surface with a cork screw rod extending out of the first surface and is positioned distal to the rod which is extending from the first surface.

* * * * *